(12) United States Patent
Guo et al.

(10) Patent No.: US 10,627,222 B2
(45) Date of Patent: Apr. 21, 2020

(54) METHOD AND APPARATUS FOR DETECTING CYLINDER AND CYLINDRICAL CONVERGING LENS

(71) Applicant: SOOCHOW UNIVERSITY, Suzhou (CN)

(72) Inventors: Peiji Guo, Suzhou (CN); Xi Chen, Suzhou (CN); Jianbin Fan, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 16/326,244

(22) PCT Filed: May 9, 2017

(86) PCT No.: PCT/CN2017/083633
§ 371 (c)(1),
(2) Date: Feb. 18, 2019

(87) PCT Pub. No.: WO2018/000942
PCT Pub. Date: Jan. 4, 2018

(65) Prior Publication Data
US 2019/0212134 A1    Jul. 11, 2019

(30) Foreign Application Priority Data

Jul. 1, 2016    (CN) .......................... 2016 1 0504450

(51) Int. Cl.
*G01B 11/24* (2006.01)
*G01M 11/00* (2006.01)
*G01B 9/02* (2006.01)

(52) U.S. Cl.
CPC ...... *G01B 11/2441* (2013.01); *G01B 9/02038* (2013.01); *G01M 11/005* (2013.01)

(58) Field of Classification Search
CPC ........... G01B 11/2441; G01B 9/02038; G01M 11/005
See application file for complete search history.

(56) References Cited

U.S. PATENT DOCUMENTS

| | | | |
|---|---|---|---|
| 4,904,084 A * | 2/1990 | Geary | ............ G01B 11/24 356/513 |
| 5,485,275 A | 1/1996 | Ohtsuka | |

(Continued)

FOREIGN PATENT DOCUMENTS

| | | |
|---|---|---|
| CN | 202747999 U | 2/2013 |
| CN | 103292738 A | 9/2013 |

(Continued)

OTHER PUBLICATIONS

Ayshah Alatawi, Absolute interferometric test of a cylindrical wavefront with a fiber optic, Nov. 14, 2014, Optical engineering, vol. 53(11), pp. 1-6 (Year: 2014).*

(Continued)

*Primary Examiner* — Michael P LaPage
(74) *Attorney, Agent, or Firm* — SZDC Law PC

(57) ABSTRACT

A method and an apparatus for detecting a cylinder and a cylindrical converging lens are disclosed. In particular, a method for non-contact interference detection of a cylindrical shape is disclosed. Two converging lenses which modulate parallel light into cylindrical waves are combined with a to-be-tested cylinder respectively. Wavefront error data of the combination of the converging lens and the to-be-tested cylinder and wavefront error data of the combination of the two cylindrical converging lenses are obtained. Shape error data of the to-be-tested cylinder, the two cylindrical converging lenses is obtained respectively by using a difference algorithm and a wavefront recovery algorithm. In the technical solution, a detection light path is simple, and shape detection of a cylinder with relatively high precision can be (Continued)

implemented without using a high-precision detection tool calibrated in advance. The technical solution is particularly suitable for cylinder processing in the field of optical processing.

10 Claims, 6 Drawing Sheets

(56) References Cited

U.S. PATENT DOCUMENTS

| | | | |
|---|---|---|---|
| 5,706,086 A | * | 1/1998 | LaFleur ............... G01B 11/255 356/513 |
| 2007/0177156 A1 | * | 8/2007 | Mansfield .......... G01B 11/2441 356/512 |

FOREIGN PATENT DOCUMENTS

| | | |
|---|---|---|
| CN | 103591888 A | 2/2014 |
| CN | 104697465 A | 6/2015 |
| CN | 104976964 A | 10/2015 |
| CN | 105318843 A | 2/2016 |
| CN | 106197311 A | 12/2016 |
| JP | H0666537 A | 3/1994 |
| JP | H10325709 A | 12/1998 |

OTHER PUBLICATIONS

Ma et al., Design and Production Error Analysis of CGH for Testing the Cylinder Surface, Optical Instructions, vol. 37, No. 5, Oct. 2015, pp. 419-425.

Yang, Master Thesis, "Study of Spherical Surface and Cylindrical Surface Absolute Measurement", Univ Nanjing Science & Tech, Aug. 30, 2004.

* cited by examiner

METHOD AND APPARATUS FOR DETECTING CYLINDER AND CYLINDRICAL CONVERGING LENS This application is the National Stage Application of PCT/CN2017/083633, filed on May 9, 2017, which claims priority to Chinese Patent Application No.: 201610504450.3, filed on Jul. 1, 2016, which is incorporated by reference for all purposes as if fully set forth herein.

FIELD OF THE INVENTION

The present invention relates to the technical field of optical instrument detection, and in particular, to a method and an apparatus for non-contact interference detection of a cylindrical shape.

BACKGROUND OF THE INVENTION

A meridional section and a sagittal section of a cylindrical optical element have different focal powers. Therefore, cylindrical optical elements are widely applied to optical systems that produce distorted images. In the civilian field, cylindrical optical elements are usually applied to anamorphic lenses, linear detector lighting, holographic lighting, barcode scanning, optical information processing, among other aspects. In recent years, with rapid development of intense laser systems, synchrotron radiation beamlines, linear test instruments, and the like, people require increasingly high cylindrical precision. However, applications of cylinder are always restricted by optical fabrication and detection technologies. Currently, the optical fabrication technology develops rapidly, but the detection technology to cylinder develops relatively slowly and generally cannot satisfy current application requirements. Therefore, a high-precision detection technology to cylinder becomes a key factor that restricts applications of cylinder. It becomes increasingly urgent to research and develop a high-precision detection technology to cylinder. High-precision detection constitutes the basis and guarantee for high-precision processing of optical elements, and is essential for high-precision processing. High-precision detection to cylinder is required to manufacture a satisfactory high-precision cylinder. However, high-precision detection to the shape of cylinders cannot be implemented by using common detection technologies because of special optical characteristics of the cylinders.

Currently, methods for detecting cylinders include template method, profilometer detection method, auxiliary plane method, optical fiber method, standard cylinder method, and computer-generated holography (CGH) method, wherein the template method and the profilometer detection method are contact detection, and a cylinder to be tested is easily scraped, and measurement precision is relatively low. The auxiliary plane method cannot detect an asymmetric deviation of a cylindrical shape. The auxiliary plane method and the optical fiber method are only applicable to cylinders with relatively small diameters. In the CGH method, a hologram needs to be separately designed, made, and computed according to the size and curvature radius of a detected cylinder. Usually, a minimum spacing between scribe lines of holographic gratings is very small, which is difficult to process and it is difficult to ensure precision. In the standard cylinder method, a standard cylinder with very high precision needs to be processed first, and the detection of the standard cylinder is still significantly difficult. Moreover, the shape precision of the standard cylinder directly affects the measurement precision of a cylinder to be detected, which increases the costs of processing and detection.

The standard cylinder method is shown in FIG. 1. A beam of parallel light passes through a standard cylindrical lens 6 configured to generate a cylindrical wave. A part of the light is transmitted. The transmitted light first converges at the center of the curvature of the cylinder to form a linear focal line 2 and then diverges to reach a cylinder 1 to be tested. When the center line of curvature of the cylinder to be tested coincides with a focal line of the standard cylindrical lens, a light wave reflected by the cylinder is used as a detected light wave with shape information of the cylinder. In the figure, a rear surface of the standard cylindrical lens 6 is a standard cylinder having a shape with very high precision. A center line of curvature of the standard cylinder coincides with the focal line of the standard cylindrical lens. A beam reflected by this surface is used as a reference light wave. Interference occurs between the detected light wave and the reference light wave to form an interferogram, and a shape deviation of the detected cylinder is determined according to the interferogram. The standard cylindrical lens is required in the detection method in which relatively high shape quality is required. Consequently, processing is difficult and the cost is high.

SUMMARY OF THE INVENTION

The objective of the present invention is to provide a method and an apparatus for detecting a cylinder and a cylindrical converging lens. Two cylindrical converging lenses are used to detect a cylindrical shape, and a difference method is used to eliminate errors regarding the two cylindrical converging lenses, so as to obtain shape error data of a to-be-tested cylinder and shape error data of the two cylindrical converging lenses. In this detection solution, the requirement to shape precision of the cylindrical converging lens is reduced, and mutual detection between the two cylindrical converging lenses and the to-be-tested cylinder can be implemented, so that processing difficulty of cylindrical converging lenses is reduced, and measurement errors of cylinders are reduced by using the difference method, thereby resolving the technical problem that high-precision detection tools need to be processed before a cylinder can be detected. High-precision measurement of a cylinder is implemented by using mutual detection and maintenance between the two cylindrical converging lenses and the to-be-tested cylinder.

Specific steps in the technical solution of the present invention are as follows:

Step 1): steps of collecting wavefront error data of a combination of a first cylindrical converging lens and a to-be-tested cylinder: sequentially arranging an interferometer configured to provide parallel light, a first cylindrical converging lens configured to modulate parallel light into a cylindrical wave, and the to-be-tested cylinder in a direction of an optical axis, where a center line of curvature of the to-be-tested cylinder coincides with a focal line formed by parallel light passing through the first cylindrical converging lens; making adjustments to enable the optical elements on the optical axis to be optically coaxial; and performing measurement by using the interferometer to obtain interferogram data of a parallel-light reference wavefront and a detected wavefront $W_A$ that is returned to the interferometer, where the detected wavefront $W_A$ carries a wavefront error $W_3$ of the first cylindrical converging lens and a wavefront error $W_1$ of the to-be-tested cylinder;

Step 2): steps of collecting wavefront error data of a combination of a second cylindrical converging lens and the to-be-tested cylinder: sequentially arranging the interferometer in step 1), a second cylindrical converging lens configured to modulate parallel light into a cylindrical wave, and the to-be-tested cylinder in step 1) in the direction of the optical axis, where the center line of curvature of the to-be-tested cylinder coincides with a focal line formed by parallel light passing through the second cylindrical converging lens; making adjustments to enable the optical elements on the optical axis to be optically coaxial; and performing measurement by using the interferometer to obtain interferogram data of the parallel-light reference wavefront and a detected wavefront $W_B$ that is returned to the interferometer, where the detected wavefront $W_B$ carries a wavefront error $W_4$ of the second cylindrical converging lens and the wavefront error $W_1$ of the to-be-tested cylinder;

Step 3): steps of collecting wavefront error data of a combination of the first cylindrical converging lens and the second cylindrical converging lens: sequentially arranging the interferometer in step 1), the first cylindrical converging lens in step 1), the second cylindrical converging lens in step 2), and a standard planar reflector in the direction of the optical axis, where the focal line of the second cylindrical converging lens coincides with the focal line of the first cylindrical converging lens, the second cylindrical converging lens is configured to remodulate diverging light passing through the focal line into parallel light, and the standard planar reflector is placed behind the second cylindrical converging lens and configured to return parallel light; making adjustments to enable the optical elements on the optical axis to be optically coaxial; and performing measurement by using the interferometer to obtain interferogram data of the parallel-light reference wavefront and a wavefront $W_C$ that is returned to the interferometer and carries information about the wavefront error $W_3$ of the first cylindrical converging lens and the wavefront error $W_4$ of the second cylindrical converging lens; and Step 4): steps of performing data processing to acquire a shape error: recovering shape error data of the to-be-tested cylinder, the first cylindrical converging lens, and the second cylindrical converging lens from the wavefronts $W_A$, $W_B$, and $W_C$ respectively obtained in the three measurements by using a wavefront recovery algorithm and data difference algorithms.

Preferred Technical Solutions:

To facilitate later data processing, the first cylindrical converging lens in step 3) and the first cylindrical converging lens in step 1) are located at the same position on the optical axis, a spatial rotation angle around the focal line of the second cylindrical converging lens between the second cylindrical converging lens in step 3) and the second cylindrical converging lens in step 2) is 180 degrees, and the second cylindrical converging lens is located at a position where the focal line of the second cylindrical converging lens coincides with the focal line of the first cylindrical converging lens.

The wavefront recovery algorithm is Fourier transform, multifold path integral or Zernike fitting, and the data difference algorithms are $W_1=(W_A+W_B-W_C)/2$, $W_3=(W_A+W_C-W_B)/2$, and $W_4=(W_B+W_C-W_A)/2$.

The above mentioned to-be-tested cylinder can be a convex cylinder or a concave cylinder; and if it is a convex cylinder, a curvature radius R of the to-be-tested convex cylinder is smaller than a focal length f of any cylindrical converging lens which is combined with it, and in the detected optical path, in the direction of the optical axis, the to-be-tested convex cylinder is placed on a front end of the focal line of the cylindrical converging lens, and the light from the cylindrical converging lens is reflected to the interferometer; if it is a concave cylinder, the to-be-tested concave cylinder is placed on a rear end of the focal line of the cylindrical converging lens, and theoretically, a cylinder with any curvature radius can be detected. During actual detection, the factors such as light intensity and fringe contrast of reflected light will also need to be considered. Stitching measurement can be used for a to-be-tested cylinder with a large diameter. A plurality of cylinders with sub-diameters are planned on the to-be-tested cylinder, and measurement results of the cylinders with sub-diameters are stitched to measure the cylinder with a large diameter.

In step 2), to facilitate adjustment of a light path, an adjusting frame that combines three-dimensional translation and three-dimensional rotation can be selected. The cylindrical converging lens is fixed on a rotating platform. The rotating platform is fixed on the adjusting frame. The adjusting frame and the rotating platform are adjusted to enable the focal line formed by parallel light passing through the cylindrical converging lens to coincide with the center line of curvature of the to-be-tested cylinder.

In step 3), the rotating platform is rotated 180 degrees, and the focal line of the second cylindrical converging lens is adjusted by using an adjusting frame to coincide with the focal line of the first cylindrical converging lens.

The first cylindrical converging lens or the second cylindrical converging lens may be selected from a standard cylindrical lens, a computer-generated holographic chip that enables parallel light to converge into a cylinder, and a single lens configured to modulate parallel light into a cylinder or a cylindrical converging system that includes more lenses. The first cylindrical converging lens can be any one selected from the foregoing types and combined with the second cylindrical converging lens, and vice versa. Certainly, the cylindrical converging lens is not limited to the foregoing types, and any other apparatus that can modulate parallel light into a cylindrical wave can be used.

The first cylindrical converging lens and the second cylindrical converging lens are replaced by a first holographic chip and a second holographic chip that converge the parallel light into a cylinder, and the +1 level diffracted light of the computer-generated holographic chip is selected as an interference carrier. A slit spatial filter is placed at the focal line of the +1 level diffracted light of the computer-generated holographic chip, and the position of the spatial filter is adjusted so that the +1 level diffracted light of the computer-generated holographic chip passes through the slit, and parasitic light can be filtered out of the +1 level diffracted light by the slit so that the interference fringe is improved. The computer-generated holographic chip can be a transmitting amplitude grating or phase grating.

Based on the foregoing method for detecting a cylinder and a cylindrical converging lens, the present invention further provides an apparatus for detecting a cylinder and a cylindrical converging lens.

The apparatus for detecting a cylinder and a cylindrical converging lens includes a horizontal substrate, a first adjusting frame, a second adjusting frame, and a third adjusting frame that are disposed on the horizontal substrate, a horizontal rotating platform fixed on the second adjusting frame, a first cylindrical converging lens disposed on the first adjusting frame, a second cylindrical converging lens disposed on the rotating platform, and a to-be-tested cylinder and a standard planar reflector that are clamped on the second adjusting frame, where:

The first cylindrical converging lens is optically coaxial with the second cylindrical converging lens and the standard planar reflector to form a first combined test area; the first cylindrical converging lens is optically coaxial with the to-be-tested cylinder to form a second combined test area; and the second cylindrical converging lens is optically coaxial with the to-be-tested cylinder to form a third combined test area;

The second cylindrical converging lens in the first combined test area is placed at a rear end of the first cylindrical converging lens, and a focal line of the second cylindrical converging lens coincides with a focal line of the first cylindrical converging lens, the second cylindrical converging lens is configured to remodulate diverging light passing through the focal line into parallel light, and the standard planar reflector is placed at a rear end of the second cylindrical converging lens and configured to return parallel light;

The to-be-tested cylinder in the second combined test area is placed at the rear end of the first cylindrical converging lens, and a center line of curvature of the to-be-tested cylinder coincides with the focal line formed by parallel light passing through the first cylindrical converging lens; and The to-be-tested cylinder in the third combined test area is placed at the rear end of the second cylindrical converging lens, and the center line of curvature of the to-be-tested cylinder coincides with the focal line formed by parallel light passing through the second cylindrical converging lens; and A spatial rotation angle around the focal line of the second cylindrical converging lens in the first combined test area between the second cylindrical converging lens in the first combined test area and the second cylindrical converging lens in the third combined test area is 180 degrees.

The apparatus may further include a digital wavefront interferometer configured to provide parallel light, where the interferometer is respectively optically coaxial with the optical elements in the first combined test area, the second combined test area, and the third combined test area.

Compared with the prior art, the present invention has the following obvious advantages: (1) a high-precision detection tool such as a standard cylindrical lens or a computer-generated hologram configured to generate a cylindrical wave does not need to be processed in advance, so that processing and detection difficulty of the detection tool is reduced; (2) two cylindrical converging lenses and a cylindrical lens are combined and mutually detected, so that system errors in measurement are reduced. The apparatus can implement high-precision detection of a convex or concave cylindrical lens and a cylindrical converging lens.

Where:
1 denotes a to-be-tested cylinder;
2 denotes a focal line;
3 denotes a first cylindrical converging lens configured to modulate parallel light into a cylindrical wave;
4 denotes a second cylindrical converging lens configured to modulate parallel light into a cylindrical wave;
5 denotes a standard planar reflector;
6 denotes a standard cylindrical lens;
7 denotes a slit spatial filter;
8 denotes a first holographic chip configured to modulate parallel light into a cylindrical wave;
9 denotes a second holographic chip configured to modulate parallel light into a cylindrical wave;
10 to 12 respectively denote a first adjusting frame, a second adjusting frame, and a third adjusting frame;
13 denotes a rotating platform;
14 denotes a horizontal substrate;
15 denotes a first combined test area;
16 denotes a second combined test area;
17 denotes a third combined test area.

DETAILED DESCRIPTION OF THE EMBODIMENTS

The "method and apparatus for detecting a cylinder and a cylindrical converging lens" of the present invention are further described below with reference to the accompanying drawings and embodiments.

Figure 1:
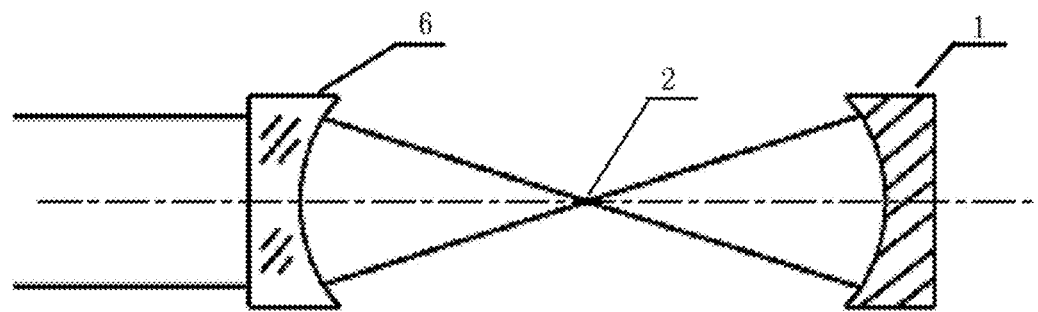
FIG. 1 is a schematic diagram of a light path of detecting a cylinder by using a standard cylinder method.
Figure 2:
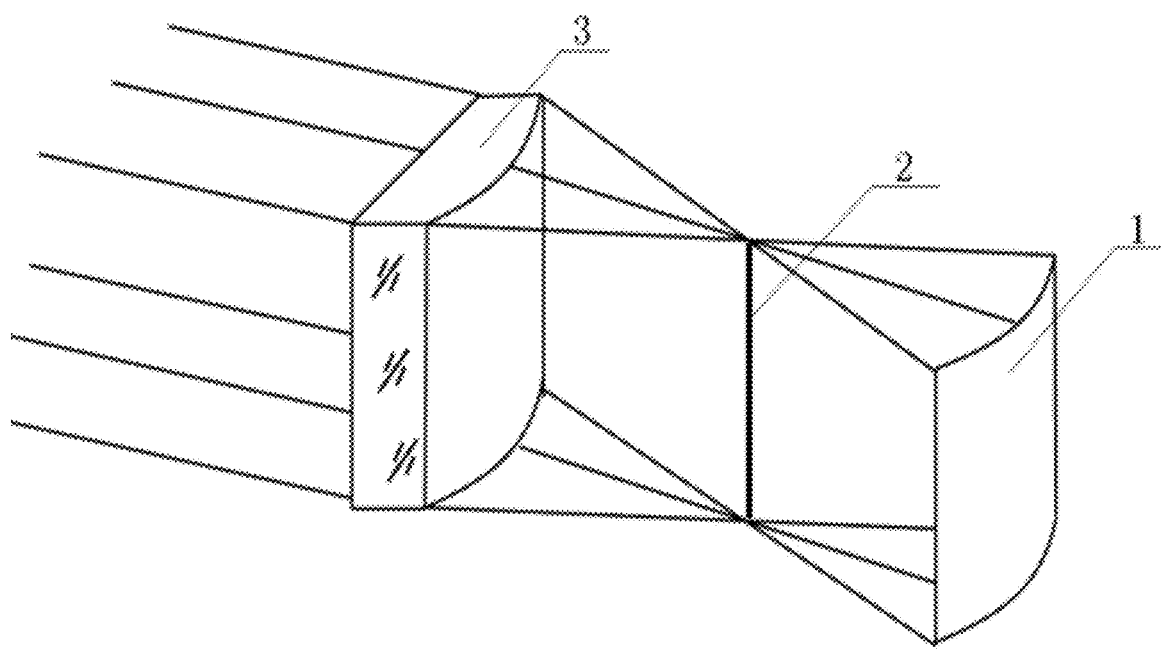
FIG. 2 is a schematic structural diagram of a combination of a first cylindrical converging lens 3 and a to-be-tested cylinder 1.
Figure 8:
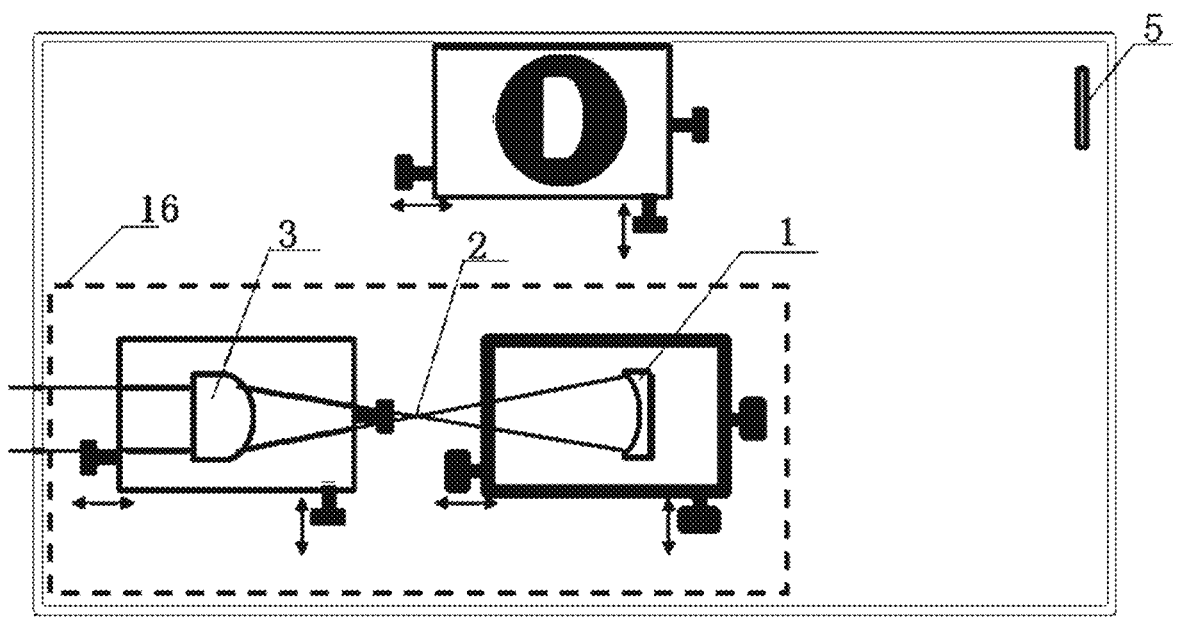
FIG. 8 is a schematic structural diagram of the second combined test area.

Embodiment 1 provides a method for detecting a cylinder and a cylindrical converging lens, including the following steps:

Step 1) is a step of collecting wavefront error data of a combination of a first cylindrical converging lens 3 and a to-be-tested cylinder 1. As shown in FIG. 2 and FIG. 8, a commercial digital wavefront interferometer, the first cylindrical converging lens 3, and the to-be-tested cylinder 1 are sequentially arranged in a direction of an optical axis. A 4-inch plane standard lens is selected as a standard lens of the interferometer and is configured to provide parallel light. A focal length of the first cylindrical converging lens 3 is 100 mm. The first cylindrical converging lens 3 enables wavefronts of parallel light to converge into a cylindrical wave and intersect at a focal line 2. The to-be-tested cylinder 1 is a concave cylinder having a curvature radius of 45 mm. The position of the to-be-tested cylinder is adjusted to enable a center line of curvature of the to-be-tested cylinder to coincide with the focal line 2. Make adjustments to enable the optical elements on the optical axis to be optically coaxial. Measurement is performed by using the interferometer to obtain interferogram data of a parallel-light reference wavefront and a detected wavefront $W_A$ that is returned to the interferometer. The detected wavefront $W_A$ carries a wavefront error $W_3$ of the first cylindrical converging lens 3 and a wavefront error $W_1$ of the to-be-tested cylinder 1.

Figure 3:
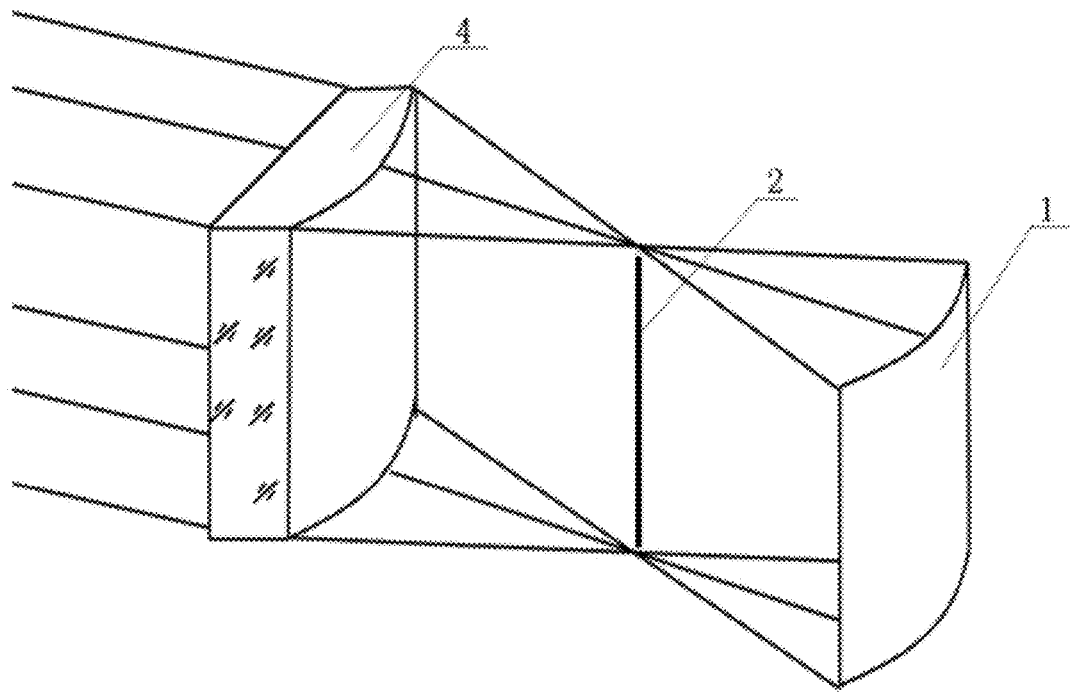
FIG. 3 is a schematic structural diagram of a combination of a second cylindrical converging lens 4 and a to-be-tested cylinder 1.
Figure 9:
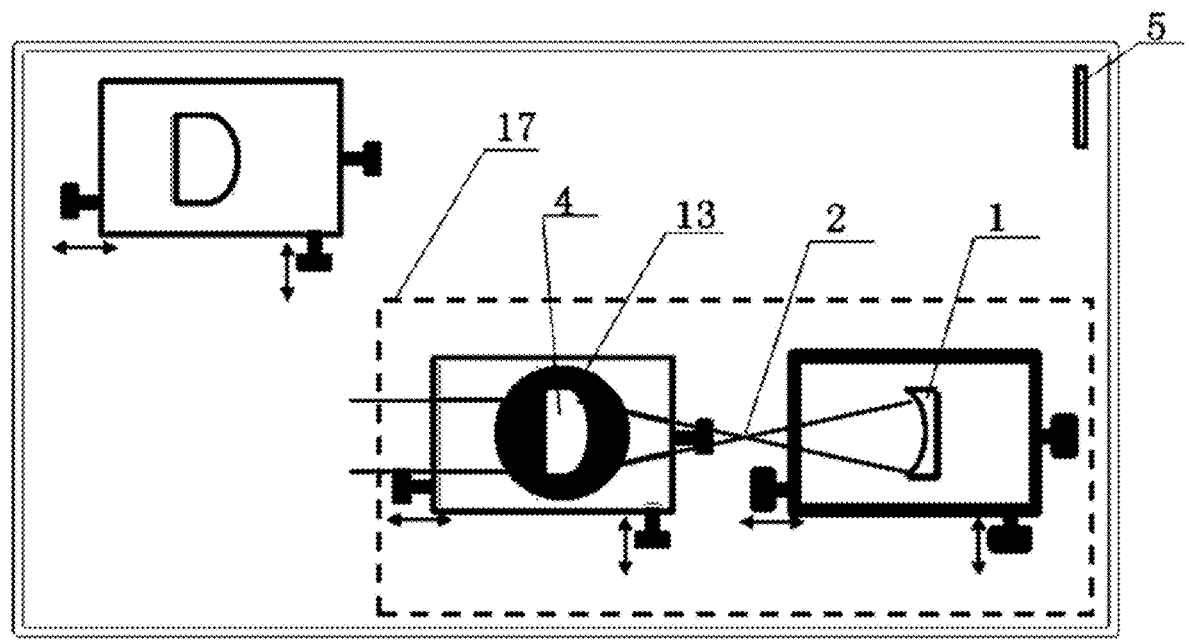
FIG. 9 is a schematic structural diagram of the third combined test area.

Step 2) is a step of collecting wavefront error data of a combination of a second cylindrical converging lens 4 and the to-be-tested cylinder 1. As shown in FIG. 3 and FIG. 9, the first cylindrical converging lens 3 is replaced with a second cylindrical converging lens 4 having a focal length of 150 mm, and step 1) is repeated. Measurement is performed by using the interferometer to obtain interferogram data of the parallel-light reference wavefront and a detected wavefront $W_B$ that is returned to the interferometer. The detected wavefront $W_B$ carries a wavefront error $W_4$ of the second cylindrical converging lens 4 and the wavefront error $W_1$ of the to-be-tested cylinder 1.

Figure 4:
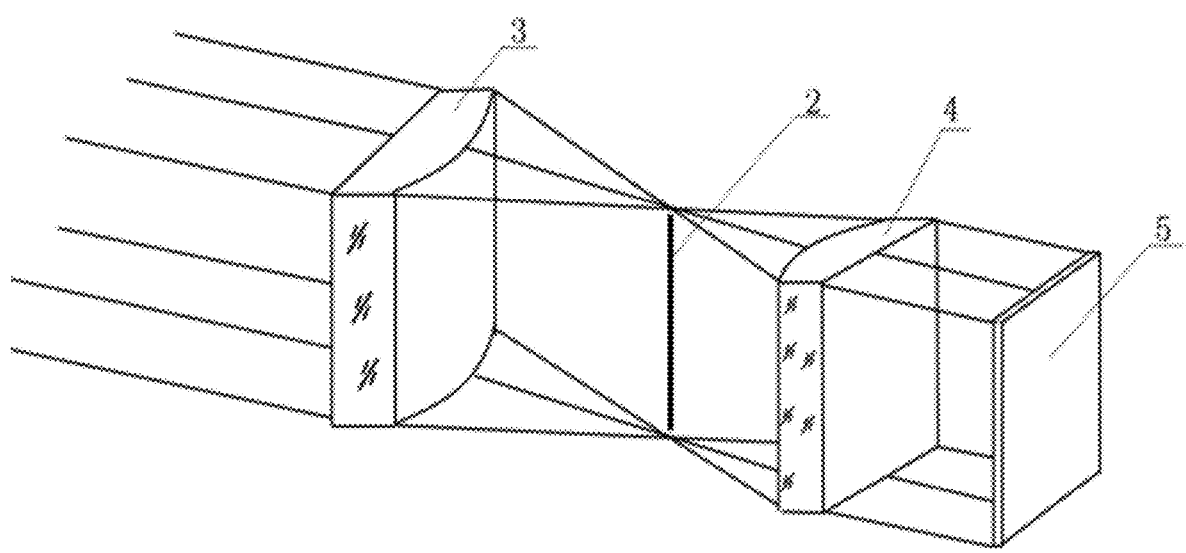
FIG. 4 is a schematic structural diagram of a combination of a first cylindrical converging lens 3 and a second cylindrical converging lens 4.
Figure 7:
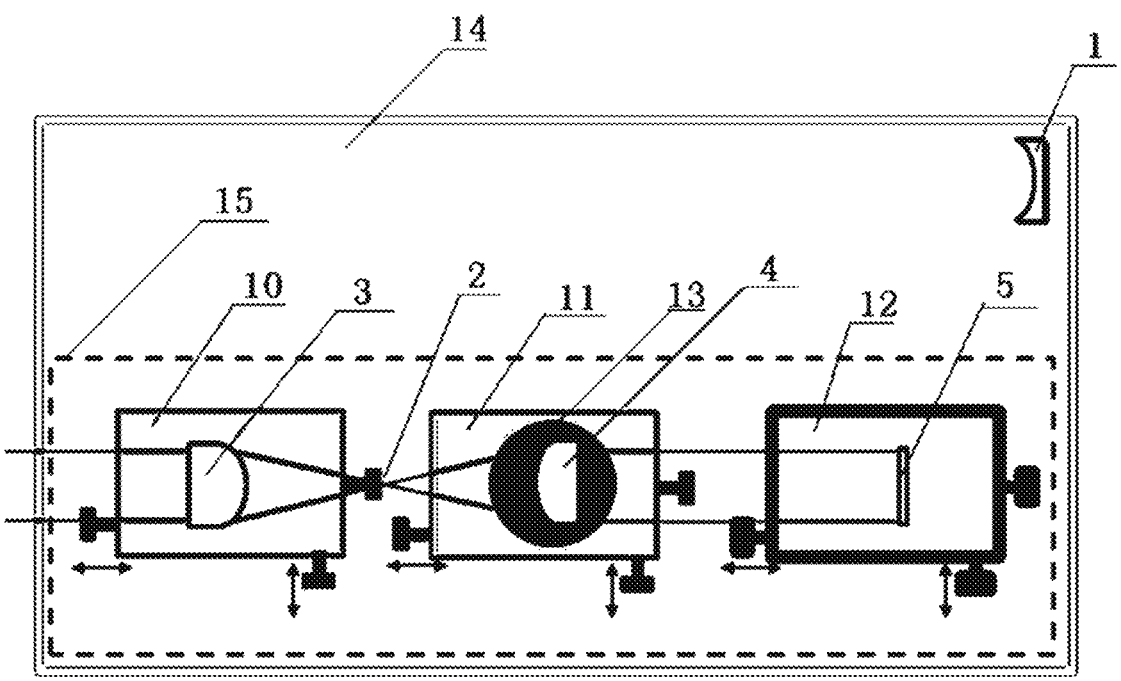
FIG. 7 is a schematic structural diagram of the first combined test area.

Step 3) is a step of collecting wavefront error data of a combination of the first cylindrical converging lens 3 and the second cylindrical converging lens 4. As shown in FIG. 4 and FIG. 7, the interferometer in step 1), the first cylindrical converging lens 3 in step 1), the second cylindrical converging lens 4 in step 2), and a standard planar reflector 5 are sequentially arranged in the direction of the optical axis. The focal line 2 of the second cylindrical converging lens 4 coincides with a focal line of the first cylindrical converging lens 3. The second cylindrical converging lens 4 is configured to remodulate diverging light passing through the focal line 2 into parallel light. The standard planar reflector 5 is placed behind the second cylindrical converging lens 4 and configured to return parallel light. Make adjustments to enable the optical elements on the optical axis to be optically coaxial. Measurement is performed by using the interferometer to obtain interferogram data of the parallel-light reference wavefront and a wavefront $W_C$ that is returned to the interferometer and carries information about the wavefront error $W_3$ of the first cylindrical converging lens 3 and the wavefront error $W_4$ of the second cylindrical converging lens 4.

Step 4) is a step of performing data processing to acquire a shape error: shape error data of the to-be-tested cylinder 1, the first cylindrical converging lens 3, and the second cylindrical converging lens 4 are recovered from the wavefronts $W_A$, $W_B$, and $W_C$ respectively obtained in the three measurements by using a wavefront recovery algorithm and data difference algorithms.

Embodiment 2: To facilitate data processing, based on Embodiment 1, the first cylindrical converging lens 3 in step 3) and the first cylindrical converging lens 3 in step 1) are located at the same position on the optical axis. A spatial rotation angle around the focal line of the second cylindrical converging lens 4 between the second cylindrical converging lens 4 in step 3) and the second cylindrical converging lens 4 in step 2) is 180 degrees. The second cylindrical converging lens 4 is located at a position where the focal line of the second cylindrical converging lens 4 coincides with the focal line of the first cylindrical converging lens 3. In step 4), the wavefront recovery algorithm is Fourier transform, multifold path integral or Zernike fitting, and the data difference algorithms are $W_1=(W_A+W_B-W_C)/2$, $W_3=(W_A+W_C-W_B)/2$, $W_4=(W_B+W_C-W_A)/2$.

Figure 5:
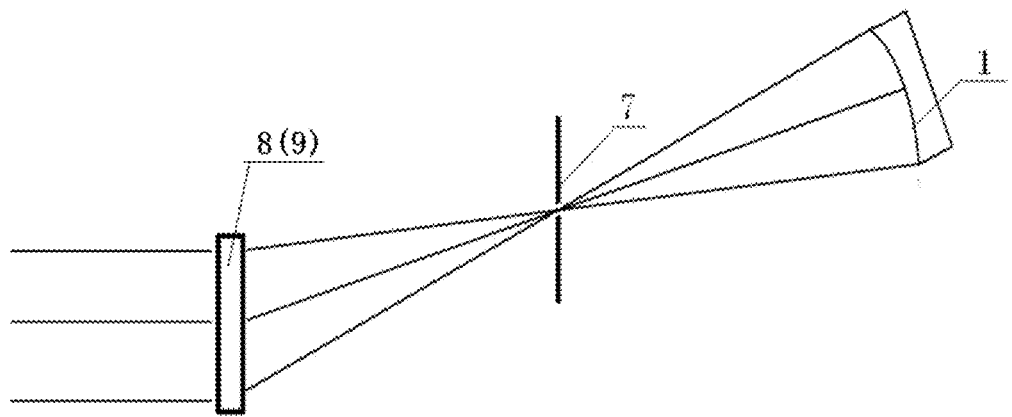
FIG. 5 is a schematic structural diagram of a combination of a cylindrical converging holographic chip and a to-be-tested cylinder 1.
Figure 6:
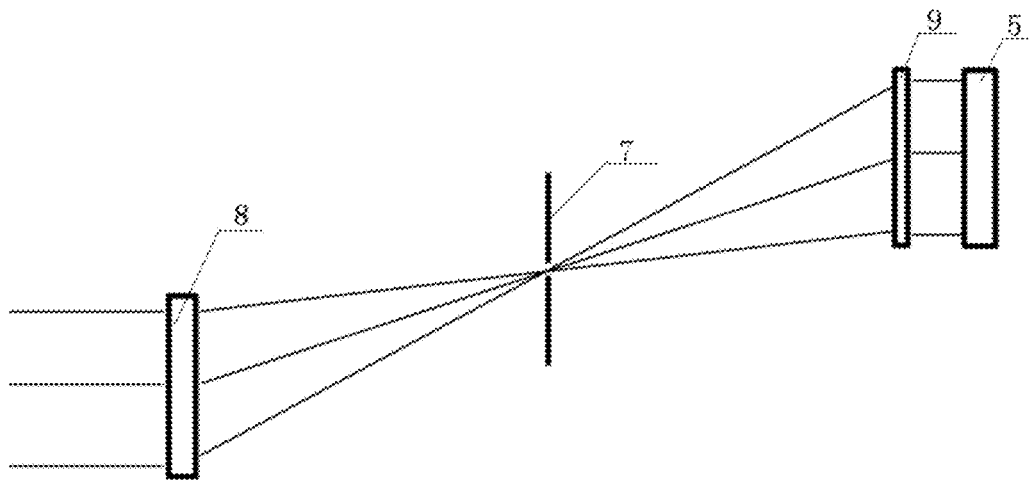
FIG. 6 is a schematic structural diagram of a combination of two cylindrical converging holographic chips.

Embodiment 3 provides a method for detecting a cylinder and a cylindrical converging lens based on Embodiment 1. The first cylindrical converging lens 3 and the second cylindrical converging lens 4 in Embodiment 1 are replaced by a first computer-generated holographic chip 8 and a second computer-generated holographic chip 9, which are transmitting phase gratings, as shown in FIG. 5 and FIG. 6, and the +1 level diffracted light of the computer-generated holographic chip is selected as an interference carrier. A slit spatial filter 7 is placed at the focal line of the +1 level diffracted light of the computer-generated holographic chip, and the position of the spatial filter 7 is adjusted so that the +1 level diffracted light of the computer-generated holographic chip passes through the slit.

Figure 10:
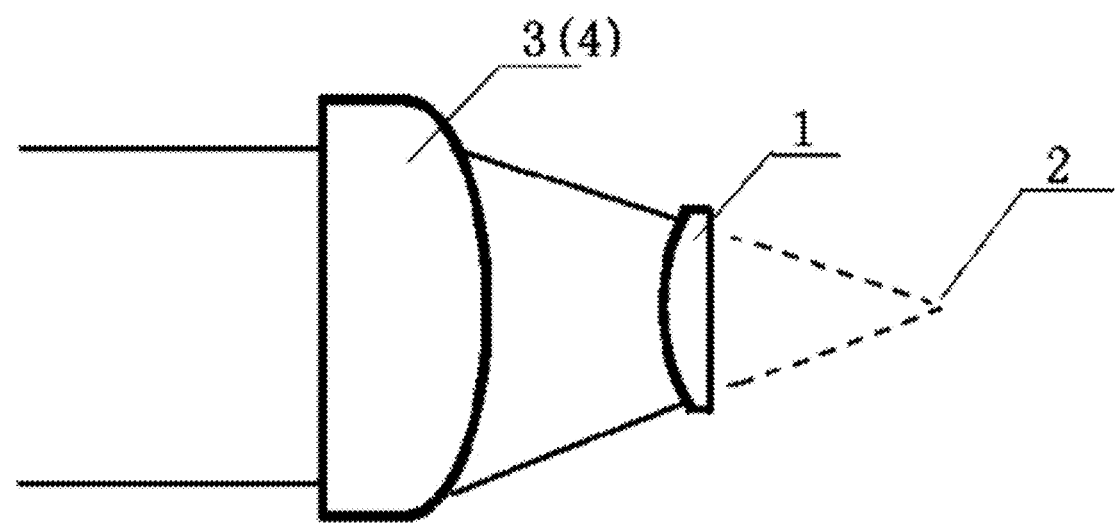
FIG. 10 is a schematic diagram of a light path when the to-be-tested cylinder is a convex cylinder.
Figure 11:
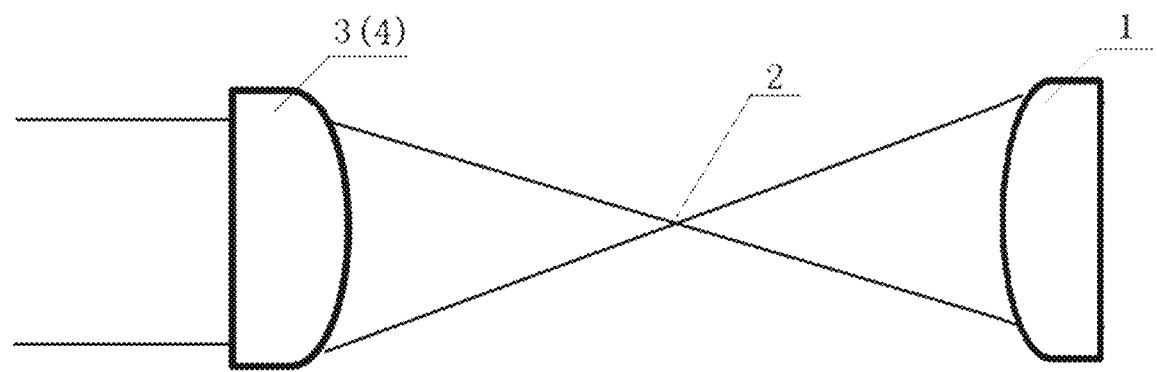
FIG. 11 is a schematic diagram of a light path when the to-be-tested cylinder is a cylindrical converging lens.
Figure 12:
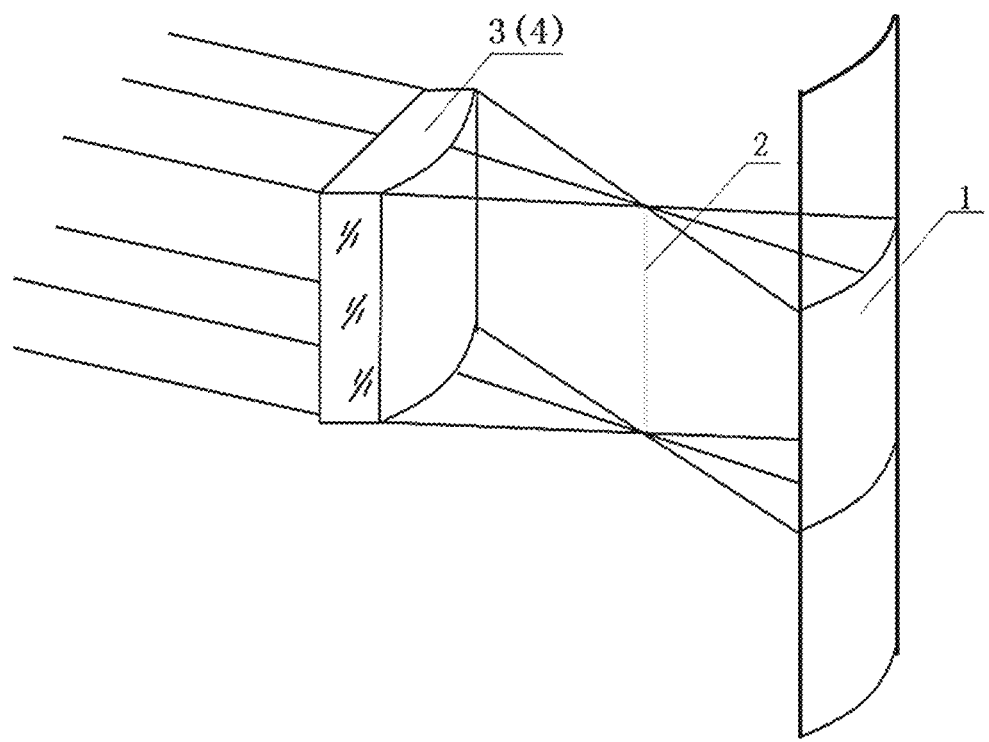
FIG. 12 is a schematic diagram of a light path when a cylinder with a large diameter is detected using a stitching method.

Embodiment 4 provides a method for detecting a cylinder and a cylindrical converging lens based on Embodiment 1. The to-be-tested cylinder may alternatively be a concave cylinder, a convex cylinder or a cylindrical converging lens. As shown in FIG. 10, when the to-be-tested cylinder is a convex cylinder, a curvature radius of the convex cylinder is smaller than a focal length f of the first cylindrical converging lenses 3 or 4 which is combined with it, and the convex cylinder is placed on a front end of the focal line 2 of the cylindrical converging lens, and a center line of curvature of the convex cylinder coincides with the focal line 2 of the cylindrical converging lens; as shown in FIG. 11, the to-be-tested cylinder can be a cylindrical converging lens, and mutual direction between each other can be achieved by using three cylindrical converging lenses; as shown in FIG. 12, when the to-be-tested cylinder is a cylinder with a large diameter, several cylinders with sub-diameters are planned on the cylinder with a large diameter, each cylinder with a sub-diameter is separately measured, and eventually a data stitching algorithm is used to detect the cylinder with a large diameter.

Embodiment 5 provides an apparatus for detecting a cylinder and a cylindrical converging lens. As shown in FIG. 7, the apparatus includes a horizontal substrate 14, a first adjusting frame 10, a second adjusting frame 11, and a third adjusting frame 12 that are disposed on the horizontal substrate 14, a horizontal rotating platform 13 fixed on the second adjusting frame 11, a first cylindrical converging lens 3 disposed on the first adjusting frame 10, a second cylindrical converging lens 4 disposed on the rotating platform 13, and a to-be-tested cylinder 1 and a standard planar reflector 5 that are clamped on the second adjusting frame 11.

The first cylindrical converging lens 3 is optically coaxial with the second cylindrical converging lens 4 and the standard planar reflector 5 to form a first combined test area 15. The first cylindrical converging lens 3 is optically coaxial with the to-be-tested cylinder 1 to form a second combined test area 16. The second cylindrical converging lens 4 is optically coaxial with the to-be-tested cylinder 1 to form a third combined test area 17.

The second cylindrical converging lens 4 in the first combined test area 15 is placed at a rear end of the first cylindrical converging lens 3. A focal line 2 of the second cylindrical converging lens 4 coincides with a focal line of the first cylindrical converging lens 3. The second cylindrical converging lens 4 is configured to remodulate diverging light passing through the focal line 2 into parallel light. The standard planar reflector 5 is placed at a rear end of the second cylindrical converging lens 4 and configured to return parallel light.

The to-be-tested cylinder 1 in the second combined test area 16 is placed at the rear end of the first cylindrical converging lens 3. A center line of curvature of the to-be-tested cylinder 1 coincides with the focal line 2 formed by parallel light passing through the first cylindrical converging lens 3.

The to-be-tested cylinder 1 in the third combined test area 17 is placed at the rear end of the second cylindrical converging lens 4. The center line of curvature of the to-be-tested cylinder 1 coincides with the focal line 2 formed by parallel light passing through the second cylindrical converging lens 4.

A spatial rotation angle around the focal line of the second cylindrical converging lens 4 between the second cylindrical converging lens 4 in the first combined test area 15 and the second cylindrical converging lens 4 in the third combined test area 17 is 180 degrees.

In the present invention, two cylindrical converging lenses are combined and mutually detected to implement high-precision measurement. The advantage is that the problem of a shape test of a detection tool used to detect a cylinder is avoided. A difference algorithm can effectively reduce a processing precision requirement of a cylindrical converging lens. In addition, the cylindrical converging lens may be selected from a group composed of a standard cylindrical lens, a computer-generated holographic chip, and a single lens configured to modulate parallel light into a cylinder or a cylindrical converging system that includes more lenses, so that the flexibility is relatively high. A cylinder with a large diameter can further be detected by using the present invention in combination with a stitching algorithm.

The invention claimed is:

1. A method for detecting a cylinder and a cylindrical converging lens, comprising:
   step 1): steps of collecting wavefront error data of a combination of a first cylindrical converging lens (3) and a to-be-tested cylinder (1): sequentially arranging an interferometer configured to provide parallel light, the first cylindrical converging lens (3) configured to modulate parallel light into a cylindrical wave, and the to-be-tested cylinder (1) in a direction of an optical axis, wherein a center line of curvature of the to-be-tested cylinder (1) coincides with a focal line (2) formed by parallel light passing through the first cylindrical converging lens (3); making adjustments to enable the optical elements on the optical axis to be optically coaxial; and performing measurement by using the interferometer to obtain interferogram data of a parallel-light reference wavefront and a detected wavefront $W_A$ that is returned to the interferometer, wherein the detected wavefront $W_A$ carries a wavefront error $W_3$ of the first cylindrical converging lens (3) and a wavefront error $W_1$ of the to-be-tested cylinder (1);
   step 2): steps of collecting wavefront error data of a combination of a second cylindrical converging lens (4) and the to-be-tested cylinder (1): sequentially arranging the interferometer in step 1), the second cylindrical converging lens (4) configured to modulate parallel light into a cylindrical wave, and the to-be-tested cylinder (1) in step 1) in the direction of the optical axis, wherein the center line of curvature of the to-be-tested cylinder (1) coincides with a focal line (2) formed by parallel light passing through the second cylindrical converging lens (4); making adjustments to enable the optical elements on the optical axis to be optically coaxial; and performing measurement by using the interferometer to obtain interferogram data of the parallel-light reference wavefront and a detected wavefront $W_B$ that is returned to the interferometer, wherein the detected wavefront $W_B$ carries a wavefront error $W_4$ of the second cylindrical converging lens (4) and the wavefront error $W_1$ of the to-be-tested cylinder (1);
   step 3): steps of collecting wavefront error data of a combination of the first cylindrical converging lens (3) and the second cylindrical converging lens (4): sequentially arranging the interferometer in step 1), the first cylindrical converging lens (3) in step 1), the second cylindrical converging lens (4) in step 2), and a standard planar reflector (5) in the direction of the optical axis, wherein the focal line (2) of the second cylindrical converging lens (4) coincides with the focal line of the first cylindrical converging lens (3), the second cylindrical converging lens (4) is configured to remodulate diverging light passing through the focal line (2) into parallel light, and the standard planar reflector (5) is placed behind the second cylindrical converging lens (4) and configured to return parallel light; making adjustments to enable the optical elements on the optical axis to be optically coaxial; and performing measurement by using the interferometer to obtain interferogram data of the parallel-light reference wavefront and a wavefront $W_C$ that is returned to the interferometer and carries information about the wavefront error $W_3$ of the first cylindrical converging lens (3) and the wavefront error $W_4$ of the second cylindrical converging lens (4); and
   step 4): steps of performing data processing to acquire a shape error: recovering shape error data of the to-be-tested cylinder (1), the first cylindrical converging lens (3), and the second cylindrical converging lens (4) from the wavefronts $W_A$, $W_B$, and $W_C$ respectively obtained in the three measurements by using a wavefront recovery algorithm and data difference algorithms.

2. The method for detecting a cylinder and a cylindrical converging lens according to claim 1, wherein the first cylindrical converging lens (3) in step 3) and the first cylindrical converging lens (3) in step 1) are located at the same position on the optical axis, a spatial rotation angle around the focal line of the second cylindrical converging lens (4) between the second cylindrical converging lens (4) in step 3) and the second cylindrical converging lens (4) in step 2) is 180 degrees, and the second cylindrical converging lens (4) is located at a position where the focal line of the second cylindrical converging lens (4) coincides with the focal line of the first cylindrical converging lens (3).

3. The method for detecting a cylinder and a cylindrical converging lens according to claim 2, wherein in step 4), the wavefront recovery algorithm is Fourier transform, multifold path integral or Zernike fitting, and the data difference algorithms are $W_1=(W_A+W_B-W_C)/2$, $W_3=(W_A+W_C-W_B)/2$, and $W_4=(W_B+W_C-W_A)/2$.

4. The method for detecting a cylinder and a cylindrical converging lens according to claim 1, wherein the to-be-tested cylinder (1) is a convex cylinder or a concave cylinder or a cylindrical converging lens.

5. The method for detecting a cylinder and a cylindrical converging lens according to claim 1, wherein the second cylindrical converging lens (4) in step 2) is fixed on a rotating platform, the rotating platform is fixed on a adjusting frame, and the adjusting frame and the rotating platform are adjusted to enable the focal line (2) formed by parallel light passing through the second cylindrical converging lens (4) to coincide with the center line of curvature of the to-be-tested cylinder (1).

6. The method for detecting a cylinder and a cylindrical converging lens according to claim 5, wherein in step 3), the rotating platform fixed with the second cylindrical converging lens (4) in step 2) is rotated 180 degrees, and the focal line of the second cylindrical converging lens (4) is adjusted by using an adjusting frame to coincide with the focal line of the first cylindrical converging lens (3).

7. The method for detecting a cylinder and a cylindrical converging lens according to claim 5, wherein the first cylindrical converging lens (3) or the second cylindrical converging lens (4) may be selected from a standard cylindrical lens, a computer-generated holographic chip that converges parallel light into a cylindrical wave, and a single lens configured to modulate parallel light into a cylinder or a cylindrical converging system that comprises more lenses.

8. The method for detecting a cylinder and a cylindrical converging lens according to claim 5, wherein the first cylindrical converging lens (3) and the second cylindrical converging lens (4) are computer-generated holographic chips, and a +1 level diffracted light of the computer-generated holographic chip is selected as an interference carrier, and a slit spatial filter (7) is placed at the focal line of the +1 level diffracted light of the computer-generated holographic chip, and the position of the spatial filter (7) is adjusted so that the +1 level diffracted light of the computer-generated holographic chip passes through the slit.

9. An apparatus for detecting a cylinder and a cylindrical converging lens, comprising a horizontal substrate (14), a first adjusting frame (10), a second adjusting frame (11), and a third adjusting frame (12) that are disposed on the horizontal substrate (14), a horizontal rotating platform (13) fixed on the second adjusting frame (11), a first cylindrical converging lens (3) disposed on the first adjusting frame (10), a second cylindrical converging lens (4) disposed on the rotating platform (13), and a to-be-tested cylinder (1) and a standard planar reflector (5) that are clamped on the second adjusting frame (11), wherein
the first cylindrical converging lens (3) is optically coaxial with the second cylindrical converging lens (4) and the standard planar reflector (5) to form a first combined test area (15); the first cylindrical converging lens (3) is optically coaxial with the to-be-tested cylinder (1) to form a second combined test area (16); and the second cylindrical converging lens (4) is optically coaxial with the to-be-tested cylinder (1) to form a third combined test area (17), wherein
the second cylindrical converging lens (4) in the first combined test area (15) is placed at a rear end of the first cylindrical converging lens (3), a focal line (2) of the second cylindrical converging lens (4) coincides with a focal line of the first cylindrical converging lens (3), the second cylindrical converging lens (4) is configured to remodulate diverging light passing through the focal line (2) into parallel light, and the standard planar reflector (5) is placed at a rear end of the second cylindrical converging lens (4) and configured to return parallel light;
the to-be-tested cylinder (1) in the second combined test area (16) is placed at the rear end of the first cylindrical converging lens (3), and a center line of curvature of the to-be-tested cylinder (1) coincides with the focal line (2) formed by parallel light passing through the first cylindrical converging lens (3);
the to-be-tested cylinder (1) in the third combined test area (17) is placed at the rear end of the second cylindrical converging lens (4), and the center line of curvature of the to-be-tested cylinder (1) coincides with the focal line (2) formed by parallel light passing through the second cylindrical converging lens (4); and
a spatial rotation angle around the focal line of the second cylindrical converging lens (4) between the second cylindrical converging lens (4) in the first combined test area (15) and the second cylindrical converging lens (4) in the third combined test area (17) is 180 degrees.

10. The apparatus for detecting a cylinder and a cylindrical converging lens according to claim 9, further comprising a digital wavefront interferometer configured to provide parallel light, wherein the interferometer is respectively optically coaxial with the optical elements in the first combined test area (15), the second combined test area (16), and the third combined test area (17).

\* \* \* \* \*